Figure 1:
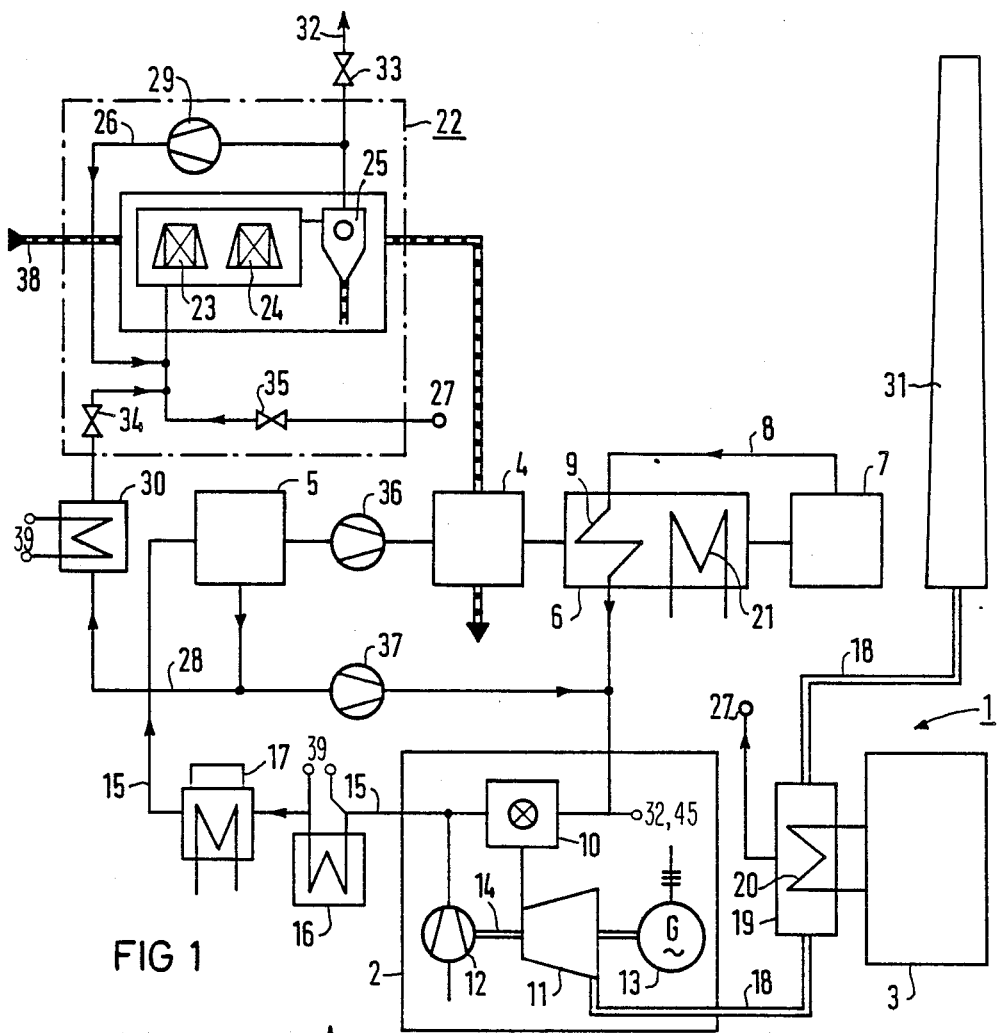

United States Patent [19]

Schiffers

[11] Patent Number: 4,976,101
[45] Date of Patent: Dec. 11, 1990

[54] COMBINED GAS AND STEAM TURBINE POWER GENERATING STATION

[75] Inventor: Ulrich Schiffers, Eckental, Fed. Rep. of Germany

[73] Assignee: Siemens Aktiengesellschaft, Munich, Fed. Rep. of Germany

[21] Appl. No.: 330,974

[22] Filed: Mar. 28, 1989

Related U.S. Application Data

[63] Continuation of Ser. No. 902,163, Aug. 29, 1986, abandoned.

[30] Foreign Application Priority Data

Sep. 2, 1985 [DE] Fed. Rep. of Germany ....... 3531305

[51] Int. Cl.⁵ .............................. F02C 3/28; F02C 6/18
[52] U.S. Cl. ................................... 60/39.12; 60/39.182
[58] Field of Search ............. 60/39.12, 39.182, 39.464, 60/39.33, 39.07

[56] References Cited

U.S. PATENT DOCUMENTS

| | | | |
|---|---|---|---|
| 3,804,606 | 4/1924 | Archer et al. ...................... | 60/39.12 |
| 3,990,229 | 11/1976 | Staege ................................. | 60/39.12 |
| 4,019,314 | 4/1977 | Springmann ........................ | 60/39.12 |
| 4,250,704 | 2/1981 | Brückner et al. ................. | 60/39.182 |
| 4,341,069 | 7/1982 | Bell et al. ........................... | 60/39.12 |

Primary Examiner—Louis J. Casaregola
Attorney, Agent, or Firm—Herbert L. Lerner; Laurence A. Greenberg

[57] ABSTRACT

A combined gas and steam turbine power generating plant includes a gas turbine, a combustion chamber of the gas turbine, an exhaust gas line of the gas turbine carrying tangible heat; a coal preparation plant including a coal milling and drying device and a coal gasifier with a coal side connected to the coal milling and drying device and a gas side; an air decomposition plant connected upstream of the coal gasifier on the gas side; a heat exchanger plant and a gas purifier connected downstream of the coal gasifier on the gas side including a pure gas line connected to the combustion chamber; a waste heat boiler connected to the exhaust line; and a device for utilizing the tangible heat in the exhaust gas line for drying milled coal in the coal preparation plant.

4 Claims, 1 Drawing Sheet

COMBINED GAS AND STEAM TURBINE POWER GENERATING STATION

This application is a continuation, of application Ser. No. 902,163, filed Aug. 29, 1986, now abandoned.

SPECIFICATION

The invention relates to a combined gas and steam turbine power generating station, including a coal gasifier, a coal preparation plant, a coal mill and a drying device, an air decomposition plant upstream of the coal gasifier, a heat exchanger and gas purification plant downstream of the coal gasifier on the gas side, a pure gas line leading to the combustion chamber of the gas turbine and a waste heat boiler connected to the exhaust gas line of the gas turbine.

German Published, Non-Prosecuted Application DE-OS 33 19 711, corresponding to U.S Ser. No. 814,577 discloses a combined gas and steam turbine power generating station in which the combustion chamber of the gas turbine is supplied with a pure gas which is first generated in a coal gasifier associated with the power generating station. To this end, on one hand milled coal is fed to the coal gasifier and on the other hand oxygen from an air decomposition plant is fed to the coal gasifier. The tangible heat of the raw gas leaving the coal gasifier is fed through heat exchanger surfaces in order to use it for heating the pure gas flowing into the combustion chamber of the gas turbine, as well as for generating steam. The exhaust gas of the gas turbine is also conducted through a waste heat steam generator. The steam turbine of the steam turbine power generating station is partially supplied with the steam generated in the heat exchangers.

In order to operate coal gasifiers, it is known to mill and dry the raw coal before it is introduced into the coal gasifier. For this purpose, part of the pure gas generated in the coal gasifier is burned and the combustion gases are conducted over the milled coal transported into the finishing powder bunker or hopper. However, such a milling and drying plant degrades the net efficiency of the overall power generating plant because it consumes part of the pure gas which is generated.

However, in order to make the drying energy for the coal available, it is already known to burn part of the milled coal and to thereby heat the feedback gas circulating in the drying plant. During this process, the net efficiency of the overall power generating plant is also decreased. In addition, the sulfer emission of the power generating plant is increased while making the drying energy available in this manner.

It is accordingly an object of the invention to provide a combined gas and steam turbine power generating station, which overcomes the hereinafore-mentioned disadvantages of the heretofore-known devices of this general type, which makes the drying energy of the milling-drying plant available in a manner which generates no additional sulfur dioxide emission and which in addition decreases the net efficiency of the overall power generating station as little as possible.

With foregoing and other objects in view there is provided, in accordance with the invention, a combined gas and steam turbine power generating plant, comprising a gas turbine, a combustion chamber of the gas turbine, an exhaust gas line of the gas turbine carrying tangible or perceptible heat, a coal preparation plant, a coal milling and a coal drying device, a coal gasifier with a coal side connected to the coal milling and drying device and a gas side, an air decomposition plant connected upstream of the coal gasifier on the gas side, a heat exchanger plant and a gas purifier connected downstream of the coal gasifier on the gas side including a pure gas line leading to the combustion chamber, a waste heat boiler connected to the exhaust gas line, and means for utilizing the tangible or perceptible heat in the exhaust gas line for drying milled coal in the coal preparation plant.

Since the tangible heat of the exhaust gas turbine is utilized for drying the coal, use is made of a heat source which is already provided in the combined gas and steam turbine power generating plant. In addition, the emission of the gas and steam turbine power generating station is not changed in any way regarding its quality or its quantity. During the recirculation of the drying medium, the consumption thereof is greatly reduced.

In accordance with another feature of the invention, the tangible heat utilizing means circulates a drying medium in the form of so-called feedback gas through the milling and drying device and removes partial quantities of the drying medium loaded with moisture and replaces the partial quantities with new heated drying medium continuously.

In accordance with again a further feature of the invention, the tangible heat utilizing means directly feeds exhaust gas from the turbine to the milling and drying device as heating and drying medium. In this way the investment costs can be minimized. In construction it is only necessary to provide one connection from the exhaust gas line of the gas turbine in the waste heat boiler and to connect it to the feedback gas line of the milling/drying plant.

In accordance with an added feature of the invention, the drying medium is in the form of a gas turbine exhaust gas admixed to inert gas. In this way, the oxygen content of the exhaust gas of the gas turbine which is used as the drying medium, can be reduced. The danger of a fire can therefore be eliminated effectively.

In accordance with an additional feature of the invention, the tangible heat utilizing means admixes nitrogen from the air decomposition plant to exhaust gas from the gas turbine.

In accordance with again another feature of the invention, there is provided another heat exchanger, means for circulating a heating medium through the other heat exchanger and the milling and drying device, and means for transporting an inert gas in a loop through the other heat exchanger. This kind of heat supply avoids any contact of the material to be milled with oxygen and thereby avoids any partial oxidation.

In accordance with again a further feature of the invention, the inert gas is a mixture of nitrogen and steam.

In accordance with again an added feature of the invention, there are provided means for drawing off vapor-like residual amounts of gas upstream of the other heat exchanger and substituting the residual amounts with new inert gas.

In accordance with again an additional feature of the invention, there is provided a further heat exchanger heating the nitrogen admixed to the drying medium, and means for feeding ultimately compressed air flowing to the air decomposition plant, through the further heat exchanger.

In accordance with still another feature of the invention, there is provided another heat exchanger heating the nitrogen admixed to the drying medium, and means for feeding exhaust gas from the gas turbine through the other heat exchanger.

In accordance with still a further feature of the invention, the tangible heat utilizing means includes means for heating feedback gas by additional combustion of a portion of pure gas.

In accordance with still an added feature of the invention, there are provided means for admixing hot combustion gases of pure gas directly to feedback gas.

In accordance with still an additional feature of the invention, there are provided means for circulating exhaust gas of the gas turbine through the other heat exchanger.

In accordance with yet another feature of the invention, there is provided an additional heat exchanger through which ultimately compressed air flowing toward the air decomposition plant is fed.

In accordance with yet a further feature of the invention, the medium-pressure steam flows through the other heat exchanger.

In accordance with a concomitant feature of the invention, there is provided a compressor feeding the removed partial quantities of drying medium loaded with moisture into the fuel gas in the pure gas line.

Other features which are considered as characteristic for the invention are set forth in the appended claims.

Although the invention is illustrated and described herein as embodied in a combined gas and steam turbine power generating station, it is nevertheless not intended to be limited to the details shown, since various modifications and structural changes may be made therein without departing from the spirit of the invention and within the scope and range of equivalents of the claims.

Figure 2:
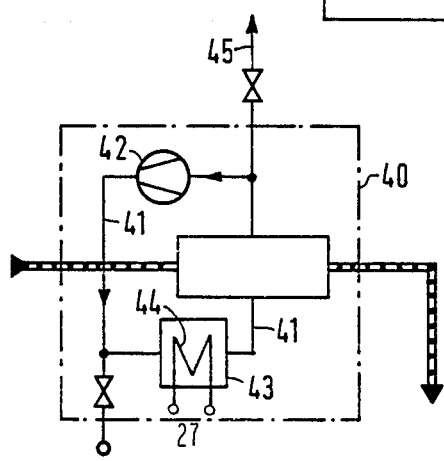

The construction and method of operation of the invention, however, together with additional objects and advantages thereof will be best understood from the following description of specific embodiments when read in connection with the accompanying drawings, in which:

FIG. 1 is a circuit diagram showing the mutual interconnection of individual subassemblies of the gas and steam turbine power generating station with the preceding coal preparation plant according to the invention; and FIG. 2 is a schematic circuit diagram of another embodiment of the coal preparation plant of FIG. 1.

Referring now to the figures of the drawings in detail and first, particularly, to FIG. 1 thereof, there is seen a combined gas and steam turbine power generating station 1 substantially formed of a gas turbine power generating part 2, a steam turbine power generating part 3, a coal gasifier 4 upstream of the gas turbine power generating part 2, an air decomposition plant 5 upstream of the coal gasifier, a heat exchanger plant 6 downstream of the coal gasifier on the raw gas side and a gas purifier 7 downstream of the heat exchanger plant on the raw gas side. A pure gas line 8 leaving the gas purifier 7 is conducted through a raw gas/pure gas heat exchanger 9 of the heat exchanger plant and is connected to a combustion chamber 10 of a gas turbine 11. An air compressor 12 and a generator 13 are coupled to a shaft 14 of the gas turbine 11. An air line 15 connected to the air compressor 12 leads to the combustion chamber 10 of the gas turbine as well as through a heat exchanger 16 and a cooler 17 to an input of the air decomposition plant 5. An exhaust gas line 18 of the gas turbine 11 leads through a waste heat boiler 19 Steam generator heating surfaces 20, 21 of the waste heat boiler 19 and the heat exchanger plant 6, are connected to the steam turbine power generating part 3, which is only diagrammatically illustrated.

The coal gasifier has a fuel side which is preceded by a milling, crushing or grinding and drying plant 22 A recirculated drying medium, the so-called feedback gas, flows through the milling/ drying plant which contains several coal grinders, crushers or mills 23, 24, a gas dust remover 25 and a non-illustrated finishing powder or dust hopper or bunker. A recirculation line 26 of the gas dust remover 25 is connected through a connecting line 27 to the exhaust gas line 18 of the gas turbine 11 as well as to a nitrogen line 28 of the air decomposition plant 5. The line 26 contains a loop compressor 29 for recirculating the drying medium. A heat exchanger 30 through which a heating medium flows, is built into the nitrogen line 28 leading to the recirculation line 26. The heating medium flowing through the heat exchanger 30 from a line 39 may be raw gas branched off upstream of the raw gas/pure gas heat exchanger or compressed air which is taken off downstream of the air compressor 12 where the line 39 begins and flows toward the air decomposition plant 5. In the flow direction of the drying medium downstream of the milling/drying plant, the recirculating line 26 contains a gas outlet 32 leading to a flue 31. Control valves 33, 34 and 35 are built into the gas outlet 32, the nitrogen line 28 and the connecting line 27 leading to the exhaust gas line 18 of the gas turbine 11.

During the operation of the gas and steam turbine power generating plant 1, air is transported into the combustion chamber 10 and into the air line 15 leading to the air decomposition plant 5 by the air compressor 12 mounted on the shaft 14 of the gas turbine 11. The pressure of the oxygen generated in the air decomposition plant is raised by an oxygen compressor 36 to the pressure level of the coal gasifier 4 which is operated with overpressure, and the oxygen is supplied to the coal gasifier. The raw gas leaving the coal gasifier flows through the heat exchanger plant 6. In the heat exchanger plant, the raw gas gives off its heat to steam generator heating surfaces 21 as well as to the raw gas/pure gas heat exchanger 9. The largely cooled-off raw gas leaving the heat exchanger plant 6 is freed of impurities in the form of dust as well as carbon dioxide, sulfur dioxide and halogen compounds, in the gas purifier 7. The gas then arrives as pure gas in the raw gas/pure gas heat exchanger 9, through which it is heated up again, and it flows into the combustion chamber 10 of the gas turbine 11. In order to reduce the formation of $NO_x$, nitrogen from the air decomposition plant 5 is admixed to the pure gas through a nitrogen compressor 37. The exhaust gas from the gas turbine gives off its tangible heat in the waste heat boiler 19 to the steam generator heating surfaces 20 and arrives at the flue 31 with a temperature of 100° to 180° C.

Raw coal arrives at the milling/drying plant 22 through a coal supply line 38, is milled in the coal mills 23, 24 in a manner which is not specifically shown and is transported by means of the drying medium (which is a mixture of nitrogen and the exhaust gas of the gas turbine in the illustrated embodiment) through the dust remover 25 into the finishing powder bunker of the milling/ drying plant. From the finishing powder bunker, the finely milled and dried coal is fed to the coal gasifier 4 as required by the consumption. The above-mentioned hot drying medium flows through the milling/drying plant 22. This drying medium is heated up by continuous admixture of hot gas turbine exhaust gas through the connecting line 27 to the exhaust gas line 28 of the gas turbine. In order to distinctly lower the relatively high oxygen content of the gas turbine exhaust gas to less than 10% by volume, oxygen from the decomposition plant 15 which is preheated somewhat in the heat exchanger 30, is continuously admixed to the gas turbine exhaust gas. Part of the excess drying medium which leaves the milling/drying plant 22 and is enriched with moisture, is continuously discharged into the atmosphere or the flue 31 through the gas outlet 32. The feed of the drying medium can be adapted to the moisture of the coal by the control valves 33, 34, 35.

It is a great advantage of the combined gas and steam turbine power generating station 1 that no additional combustion becomes necessary for making the drying energy available and that therefore no additional emission is generated either. The milling/ drying plant 22 can therefore be operated in a completely neutral manner as far as emission is concerned. In addition, neither coal nor pure gas is burned for making the drying energy available (both measures would reduce the net efficiency of the gas and steam turbine power generating station); instead, the residual heat of part of the exhaust gas of the gas turbine is utilized.

FIG. 2 shows a different milling/drying plant 40 which can be connected to the otherwise unchanged gas and steam turbine power generating plant of FIG. 1 instead of the milling/drying plant 22 shown in FIG. 1. In this milling/drying plant 40, the drying medium is formed of pure nitrogen which is fed from the air decomposition plant 5 into a recirculating line 41. In addition, a heat exchanger 43 is inserted into the recirculating line apart from a circulation compressor 42; the heat exchanger heating surface 44 conducts either gas turbine exhaust gas from the line 27 or air which flows toward the air decomposition plant 5 and is heated up by the compression or by medium-pressure steam. In this embodiment of the milling/drying plant, the material to be milled does not come into contact with oxygen and the drying medium is substantially formed of nitrogen and steam.

In the last-mentioned case as well, the drying energy is made available in a manner which is emission-neutral. During the feeding of gas turbine exhaust gas or ultimately compressed air into the heat exchanger 43, the net efficiency of the power generating plant is not adversely affected either. A slight degradation of the net efficiency of the power generating plant could be expected only if the heat exchanger 43 was connected to a medium-pressure steam tap. However, the last-mentioned construction would have the advantage of permitting the heating power to be increased substantially if very moist coal is to be dried. It would also be possible to raise the increased drying energy by the additional combustion of pure gas or coal with the disadvantages described at the outset, if very moist coal or other moist fuels are used.

Instead of discharging the moist drying medium through a gas outlet 32 or 45 into the atmosphere, it could also be compressed and then admixed to the fuel gas flowing toward the combustion chamber 10 of the gas turbine 11 in the pure gas line 8.

The foregoing is a description corresponding in substance to German application P 35 31 305.6, filed Sept. 2, 1985, the International priority of which is being claimed for the instant application, and which is hereby made part of this application. Any material discrepancies between the foregoing description and the aforementioned corresponding German application are to be resolved in favor of the latter.

I claim:

1. Combined gas and steam turbine power generating plant, comprising a gas turbine, a combustion chamber of said gas turbine, an exhaust gas line of said gas turbine carrying tangible heat; a coal preparation plant including a coal milling and drying device and a coal gasifier with a coal side connected to said coal milling and drying device and a gas side; an air decomposition plant connected upstream of said coal gasifier on said gas side; a heat exchanger plant and a gas purifier connected downstream of said coal gasifier on said gas side including a pure gas line connected to said combustion chamber; a waste heat boiler connected to said exhaust gas line; means for utilizing said tangible heat in said exhaust gas line for drying milled coal in said coal preparation plant, said tangible heat utilizing means being in the form of means for circulating an inert drying medium in the form of feedback gas through said milling and drying device, for removing partial quantities of the drying medium loaded with moisture and for replacing the partial quantities with new heated drying medium continuously, another heat exchanger, means for circulating a heating medium through said other heat exchanger and said milling and drying device, and means for transporting an inert gas in a loop through said other heat exchanger.

2. Gas and steam turbine power generating plant according to claim 1, wherein said tangible heat utilizing means includes means for feeding said inert gas in the form of nitrogen to which steam is admixed in said milling and drying device.

3. Gas and steam turbine power generating plant according to claim 1, including means for drawing off residual amounts of the inert gas with admixed water vapor upstream of said other heat exchanger and substituting said residual amounts with new inert gas.

4. Gas and steam turbine power generating plant according to claim 1, including means for feeding exhaust gas of said gas turbine through said other heat exchanger.

* * * * *